(12) United States Patent
Bogumil et al.

(10) Patent No.: US 11,474,049 B2
(45) Date of Patent: Oct. 18, 2022

(54) CONFORMABLE X-RAY SENSOR PANEL

(71) Applicant: CARESTREAM HEALTH, INC., Rochester, NY (US)

(72) Inventors: Todd D. Bogumil, Rochester, NY (US); Ravi K. Mruthyunjaya, Penfield, NY (US)

(73) Assignee: Carestream Health, Inc., Rochester, NY (US)

( * ) Notice: Subject to any disclaimer, the term of this patent is extended or adjusted under 35 U.S.C. 154(b) by 19 days.

(21) Appl. No.: 17/124,739

(22) Filed: Dec. 17, 2020

(65) Prior Publication Data

US 2021/0190704 A1    Jun. 24, 2021

Related U.S. Application Data

(60) Provisional application No. 62/950,140, filed on Dec. 19, 2019, provisional application No. 63/002,398, filed on Mar. 31, 2020.

(51) Int. Cl.
*G01N 23/04* (2018.01)
*G01N 23/083* (2018.01)

(52) U.S. Cl.
CPC .......... *G01N 23/04* (2013.01); *G01N 23/083* (2013.01); *G01N 2223/04* (2013.01); *G01N 2223/40* (2013.01); *G01N 2223/50* (2013.01)

(58) Field of Classification Search
CPC .. G01N 23/04; G01N 23/083; G01N 2223/04; G01N 2223/40; G01N 2223/05
See application file for complete search history.

(56) References Cited

U.S. PATENT DOCUMENTS 4,065,670 A * 12/1977 Morsell .............. G03G 15/0545
378/33

* cited by examiner

*Primary Examiner* — Courtney D Thomas

(57) ABSTRACT

A flexible digital radiographic detector assembly uses a conformable bag having granular media therein to enclose the detector and to help fit the detector onto a curved object. The conformable bag is evacuated to hold the detector against the object to be imaged. An image of the object is acquired by aiming x-rays through the object toward the detector.

18 Claims, 4 Drawing Sheets

CONFORMABLE X-RAY SENSOR PANEL

CROSS REFERENCE TO RELATED APPLICATIONS

This application claims priority to U.S. Patent Application Ser. No. 62/950,140, filed Dec. 19, 2019, in the name of Bogumil, et al., entitled RADIOGRAPHIC DETECTOR READOUT, and to U.S. Patent Application Ser. No. 63/002,398, filed Mar. 31, 2020, in the name of Bogumil, et al., entitled CONFORMABLE X-RAY SENSOR PANEL, both of which are hereby incorporated by reference herein in their entirety.

This application is related in certain respects to U.S. patent application Ser. No. 16/603,424, having a U.S. 371(c) date of Oct. 7, 2019, and an international filing date of May 15, 2015, in the name of Wojcik, et al., and entitled FLEXIBLE SUBSTRATE MODULE AND FABRICATION METHOD, which is hereby incorporated herein by reference in its entirety.

BACKGROUND OF THE INVENTION

The subject matter disclosed herein relates to digital x-ray imaging of objects using a flexible enclosure configured to secure a flexible digital radiographic detector to objects to be radiographically imaged.

The discussion above is merely provided for general background information and is not intended to be used as an aid in determining the scope of the claimed subject matter.

BRIEF DESCRIPTION OF THE INVENTION

A flexible digital radiographic detector assembly uses a conformable bag having granular media therein to enclose the detector and to help fit the detector onto a curved object. The conformable bag is evacuated to hold the detector against the object to be imaged. An image of the object is acquired by aiming x-rays through the object toward the detector. An advantage that may be realized in the practice of some disclosed embodiments of the conformable detector is to simplify securing radiographic detectors to surfaces of objects.

The present disclosure is directed to an enclosure resembling a sac, envelope, bag, or pouch, formed from an elastomeric material and enclosing a cavity therewithin. A flexible digital radiographic (DR) detector is disposed within the cavity together with granular structures and a gas, such as air, thereby enclosing all the components within the enclosure.

The granular media, such as sand, ground coffee or similar material, is mixed with air such that the enclosure, with flexible detector inside, conforms readily around an object to be imaged. After the enclosure is shaped to conform around the object to be imaged, the enclosure may be air-evacuated, i.e., depressurized or vacuum compressed, to tighten the enclosure around the granular media and thereby fix the enclosure against the object to be imaged. A sealable opening, channel or valve may be incorporated into the elastomeric enclosure to allow communication between the air space within the enclosure and an air pressure source configured to apply positive or negative air pressure thereto. The air pressure source may be powered by an electric motor, pressurized tank, or it may be a manually operated air pump.

In one embodiment, a digital radiographic detector assembly includes a conformable bag, a flexible digital radiographic detector enclosed by the bag, and granular media enclosed by the bag. An opening in the bag is used to evacuate air therefrom, and to compress the granular media and to stiffen the assembly.

In one embodiment, a method comprises providing a flexible digital radiographic detector, enclosing the detector in a conformable bag, adding granular media into the bag, manually positioning the bag on an object to be radiographically imaged, and evacuating air from the bag.

In one embodiment, a method comprises enclosing a digital radiographic detector and granular media in a conformable bag. The conformable bag is then position on a surface of an object. Air is evacuated from the bag and the object is exposed to x-rays. A radiographic image of the object is captured in the detector.

This brief description of the invention is intended only to provide a brief overview of subject matter disclosed herein according to one or more illustrative embodiments, and does not serve as a guide to interpreting the claims or to define or limit the scope of the invention, which is defined only by the appended claims. This brief description is provided to introduce an illustrative selection of concepts in a simplified form that are further described below in the detailed description. This brief description is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of the invention. In the drawings, like numerals are used to indicate like parts throughout the various views. Thus, for further understanding of the invention, reference can be made to the following detailed description, read in connection with the drawings in which.

DETAILED DESCRIPTION OF THE INVENTION

Figure 1:
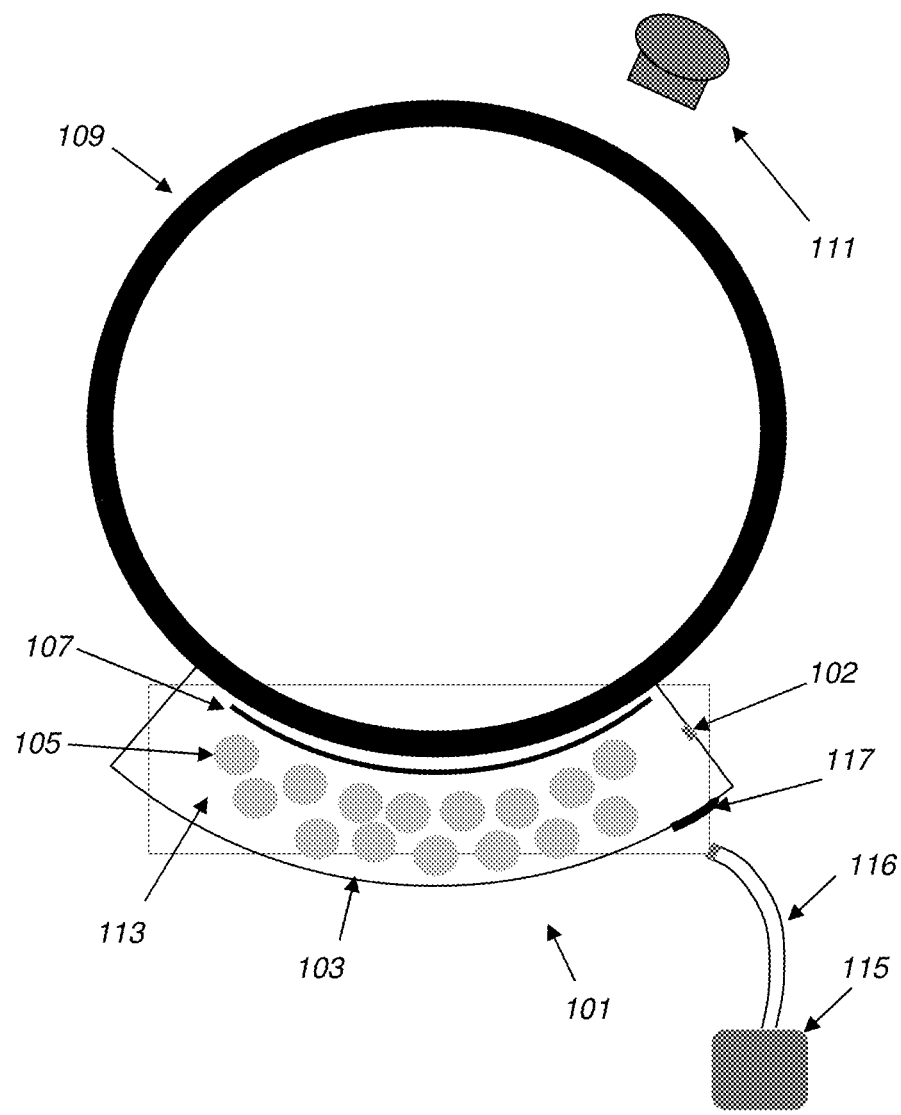
FIG. 1 is a cross-section schematic diagram of a detector assembly positioned against an object.

FIG. 1 is a schematic cross-section diagram of an object 109 to be imaged and a detector assembly 101 which includes a flexible enclosure 103 together with granular media 105 and a flexible DR detector 107 inside the enclosure 103. A resealable slit, or other resealable opening, 102 may be formed along one end of the enclosure 103 to insert and/or remove the flexible DR detector 107 and the granular media 105 into and out of the enclosure 103. The detector assembly 101 is positioned on an object 109, such as a pipe, shown in a cross-section view in FIG. 1. Within the enclosure 103, the flexible DR detector 107 may be disposed closer to the object 109 than most of the granular media 105, although such an arrangement is not required. During positioning of the detector assembly 101 on the object 109, which may be performed manually, an amount of air 113 may be mixed with the granular media 105 within the enclosure 103 so that the detector assembly 101 remains flexible and pliant. After the detector assembly 101 is positioned on the object 109, an air pump 115 may be connected to the enclosure 103 to evacuate at least some of the air 113 therefrom. A valve, or other resealable opening, 117 may be formed in the enclosure 103 to receive a tube, or hose, 116 from the air pump 115 to pressurize or depressurize the enclosure 113. In one embodiment, the resealable opening 117 may also be used to deliver the granular media 105 into the enclosure 103. The evacuation of air from the enclosure 103 will compress the granular media 105 and cause the detector assembly 101 to stiffen, thereby securing the detector assembly 101 in position against the object 109. A radiographic image of the object 109 may be captured in the flexible DR detector 107 by aiming and firing an x-ray source 111 through at least a portion of the object 109 toward the detector assembly 101. As described herein, the flexible enclosure may be made from a conformable, pliant elastomeric material.

Figure 2A:
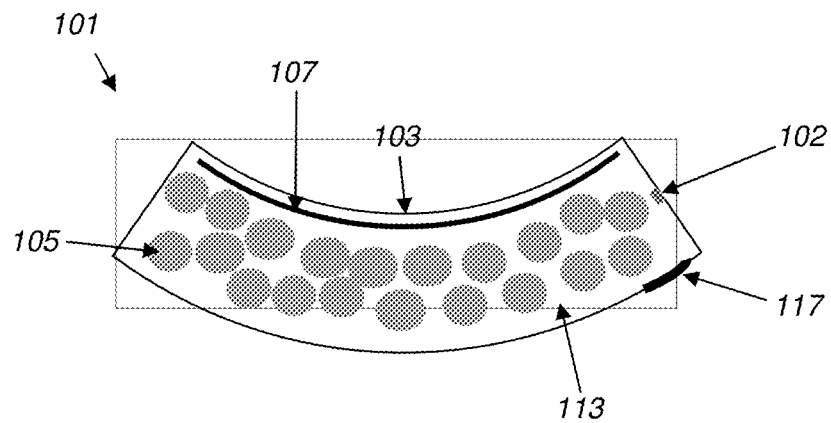
FIGS. 2A-2B are cross-section schematic diagrams of a detector assembly.
Figure 2B:
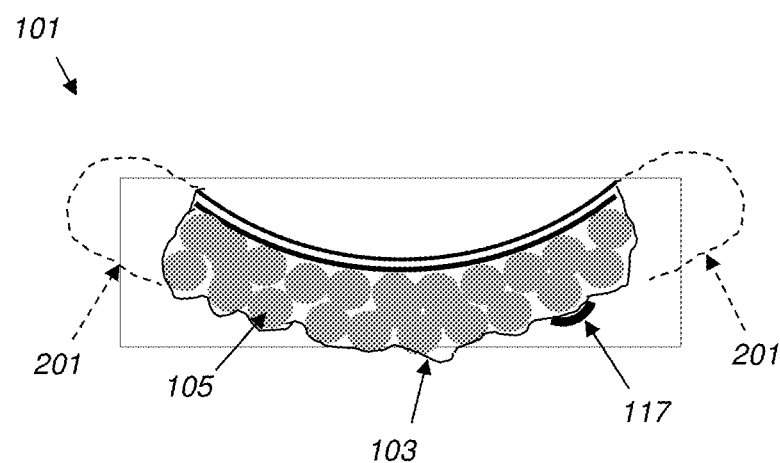

FIGS. 2A-B are schematic cross-section diagrams illustrating a shape of the detector assembly 101 as positioned against an object to be imaged 109 (FIG. 1), but without the object for ease of illustration. As shown in FIG. 2A, the air 113 inside flexible enclosure 103 allows free movement of the granular media 105 so that the flexible enclosure 103 remains flexible and allows the detector assembly 101 to be manually shaped and conformed to match and fit snugly against a curved surface of an object to be imaged. FIG. 2B illustrates a shape of the detector assembly 101 after at least some of the air 113 is evacuated from inside the enclosure 103 through resealable opening 117. The flexible enclosure 103 shrink wraps against the granular media thereby stiffening the entire detector assembly 101. A portion of the volume 201 within the enclosure 103 is removed or reduced by evacuating air 113 from inside of the enclosure 103. As the air 113 is evacuated from inside the enclosure 103, the enclosure 103 shrink wraps against the granular media and the flexible DR detector 107, as shown in FIG. 2B. The free movement of the granular media 105 within the enclosure 103 is greatly reduced in the evacuated state due to compression of the granular media by the enclosure 103.

Figure 3:
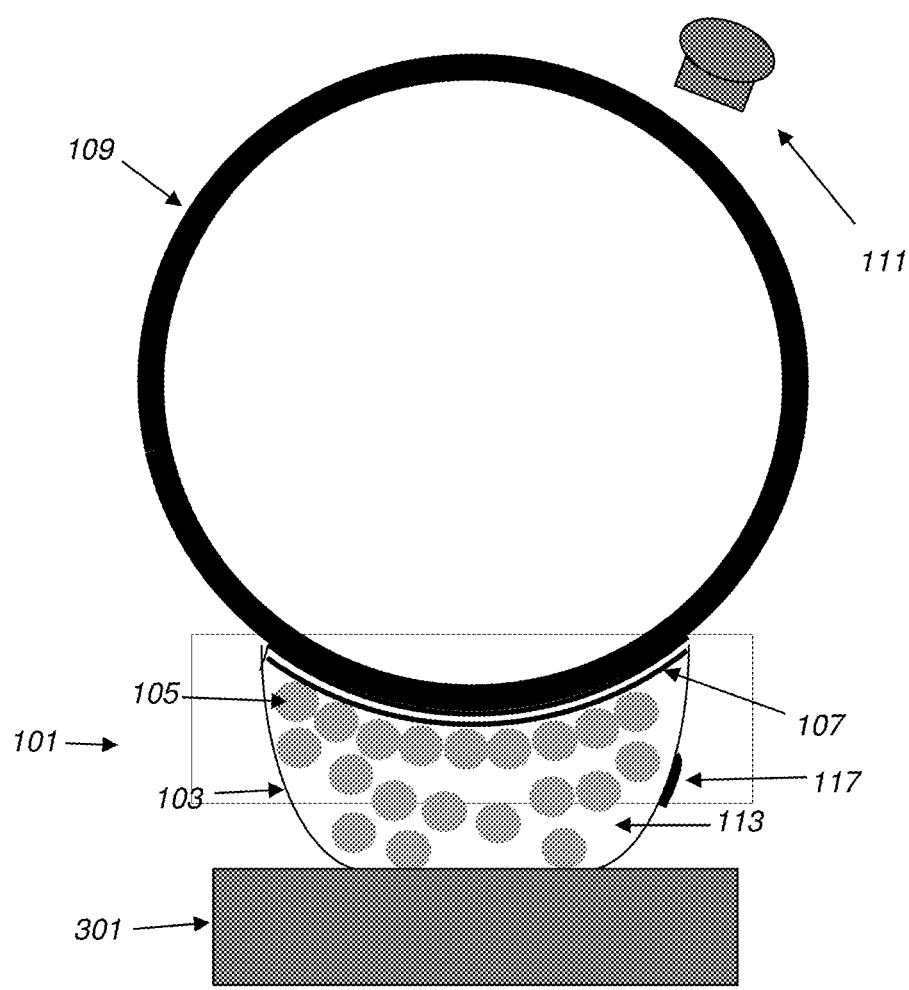
FIG. 3 is a cross-section schematic diagram of a detector assembly wedged between objects.

In one example embodiment as shown in the cross-section diagram of FIG. 3, the detector assembly 101 may be wedged between objects, such as the object to be imaged 109 and another structure 301, which structure may be a wall or other equipment, for example. The enclosure 103 may then be pressurized through resealable opening 117 using the air pump 115 to fill the enclosure with air 113, thereby expanding a size of the enclosure 103 against the objects 109, 301, to retain the detector assembly 101 in position between the objects 109, 301. The detector assembly 101 may then be used for x-ray imaging the abutting object 109 while being wedged between the objects 109, 301. The positive pressurization of the enclosure 103 may serve to press the flexible DR detector 107 against and closer to the object 109 to be imaged.

Figure 4:
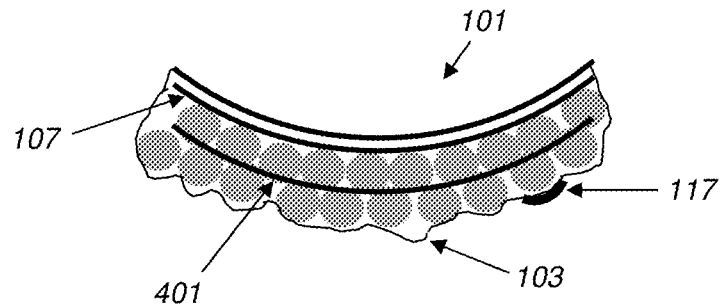
FIG. 4 is a cross-section schematic diagram of a detector assembly with a stiffening member.

FIG. 4 is a cross-section diagram illustrating an embodiment wherein a shape limiting rigid or semi-rigid structure, or stiffening member, 401, in the form of a sheet, is positioned within the enclosure 103. The stiffening member 401 may also be made from an elastomeric material, plastic, or rubber, that is less flexible than the detector assembly 101 as a whole to limit conformational bending, i.e., radius of curvature, of the detector assembly 101 and its enclosed flexible detector 107 electronics to prevent damage thereto. Other structural members such as a shield layer may also be added inside the enclosure 103, as desired. Such layers, such as an x-ray shielding lead layer, or lead foil layer, may also be incorporated into the shape limiting stiffening member 401 as a layer therein, for example.

Figure 5:
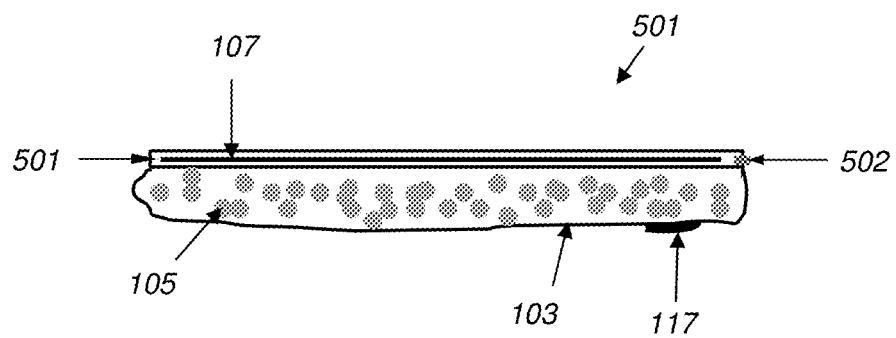
FIG. 5 is a cross-section schematic diagram of a detector assembly having a sleeve compartment.

FIG. 5 is a cross-section diagram of a detector assembly 501 embodiment wherein a separate flexible compartment, or sleeve, 501 is integrally formed with the enclosure 103 using the same elastomeric material. The cavity within sleeve portion 501 does not communicate with the cavity of enclosure 103 so that pressurizing or depressurizing enclosure 103 does not alter a pressure within the compartment 501. The compartment 501 may have an open end to receive flexible DR detector 107 inserted therein. The compartment 501 may be formed to have a size, or area, slightly larger than the flexible DR detector 107. In one embodiment, the compartment 501 may include a reusable adhesive or a releasable mechanically interlocking strip 502 at one end to seal or enclose the cavity of compartment 501 to prevent flexible DR detector 107 from unintentionally sliding out of the compartment 501. In one embodiment, the compartment 501 may be formed as a separate envelope that is attached to enclosure 103, such as by using a permanent or temporary adhesive. In one embodiment, the compartment 501 may be formed as a separate envelope that is attached to enclosure 103 using temporary fasteners, such as hook and loop fasteners. The detector assembly 501 may be used and modified in the same manner as the detector assembly 101 described herein with respect to FIGS. 1-4.

Figure 6:
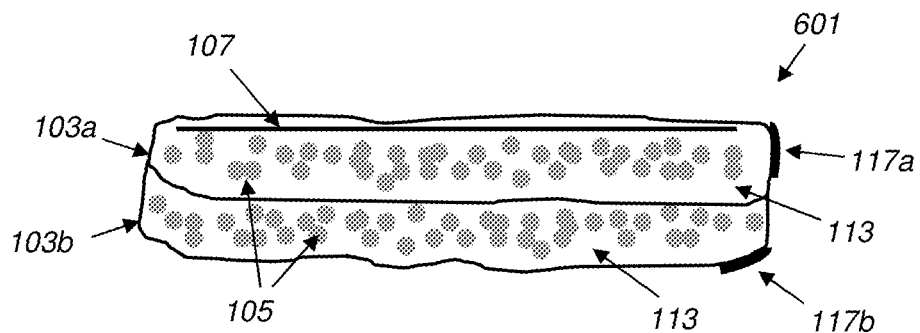
FIG. 6 is a cross-section schematic diagram of a detector assembly having multiple chambers.

In another embodiment, shown in FIG. 6, the detector assembly 601 provides both shape conforming and stiffening by integrally forming a dual chamber design, or dual enclosure design, so that one enclosure 103a contains the flexible DR detector 107, air 113 and granular media 105. Enclosure 103a may be evacuated (negative pressure) through valve 117a while a second separate enclosure 103b, also formed as an elastomeric pouch containing air 113 and granular media 105, is pressurized through valve 117b, or vice versa with respect to pressurizing and depressurizing the enclosures 103a, 103b. Such an embodiment may be useful in the application illustrated in FIG. 3 wherein the enclosure 103a may be evacuated (depressurized) to fit the detector assembly 601 on the surface of the object 109 in the gap between the object 109 to be imaged and the structure 301, while the enclosure 103b is pressurized, thereby increasing a size of the enclosure 103b, to secure or wedge the detector assembly 601 between the object 109 and the structure 301. In one embodiment, the enclosures 103a, 103b, are formed as pouches that are attachable and detachable from each other, such as by using a temporary adhesive on adjacent facing surfaces of the enclosures 103a, 103b.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A flexible digital radiographic detector assembly comprising:
   a conformable bag;
   a flexible digital radiographic detector enclosed by the bag;
   granular media enclosed by the bag; and
   an opening in the bag configured to evacuate air therefrom, wherein the granular media is compressed and the assembly stiffens.

2. The assembly of claim 1, wherein the opening in the bag is configured to receive a device for evacuating air from the bag or for pressurizing the air in the bag.

3. The assembly of claim 1, further comprising a valve in the bag configured to engage a device for applying a positive or negative air pressure to the bag.

4. The assembly of claim 1, wherein the bag further comprises two adjoining separate chambers, a first one of the two separate chambers enclosing the digital radiographic detector.

5. The assembly of claim 4, wherein a second one of the two separate chambers is pressurized while the first one of the two separate chambers is depressurized.

6. The assembly of claim 4, wherein a second one of the two chambers is releasably attached to the first one of the two chambers.

7. The assembly of claim 1, further comprising a semi-rigid member within the bag, the semi-rigid member configured to limit a conformational bending of the flexible DR detector when air is evacuated from the bag.

8. The assembly of claim 7, wherein the semi-rigid member comprises a layer of lead or other radiopaque material.

9. A method comprising:
   providing a flexible digital radiographic detector;
   enclosing the flexible digital radiographic detector in a conformable bag;
   adding granular media into the conformable bag;
   manually positioning the bag having the detector and granular media therein on an object to be radiographically imaged;
   either evacuating air from the bag or pressurizing the bag, for securing the bag against the object to be radiographically imaged; and
   firing an x-ray source through at least a portion of the object toward the flexible digital radiographic detector to capture a radiographic image of at least the portion of the object.

10. The method of claim 9, wherein the step of evacuating comprises forming an opening in the conformable bag and pumping air from the conformable bag through the opening.

11. The method of claim 9, wherein the step of evacuating comprises forming a valve in the conformable bag and applying a negative air pressure thereto.

12. The method of claim 10, further comprising forming two chambers in the conformable bag, including disposing the digital radiographic detector in a first one of the two chambers.

13. The method of claim 12, further comprising depressurizing the first one of the two chambers and simultaneously pressurizing a second one of the two chambers.

14. The method of claim 12, wherein the step of forming comprises attaching a second one of the two chambers to the first one of the two chambers.

15. The method of claim 9, further comprising disposing a semi-rigid member within the conformable bag.

16. A method comprising:
   enclosing a digital radiographic detector and granular media in a conformable bag;
   positioning the conformable bag on a surface of an object to be radiographically imaged;
   evacuating air from the conformable bag;
   radiographically exposing the object to be radiographically imaged; and
   capturing a radiographic image of the object to be imaged using the enclosed digital radiographic detector.

17. The method of claim 16, wherein the step of evacuating comprises evacuating a first chamber of the conformable bag, and wherein the method further comprises pressurizing a second chamber of the conformable bag.

18. The method of claim 16, further comprising enclosing a stiffening member in the conformable bag.

* * * * *